(12) United States Patent
Tan

(10) Patent No.: US 7,637,510 B2
(45) Date of Patent: Dec. 29, 2009

(54) CHUCK WITH GRIPPING MECHANISM STOP

(75) Inventor: Xingda Tan, Wendeng Shandong (CN)

(73) Assignee: Shandong Weida Machinery Company Limited, Huishan, Wendeng, Shandong (CN)

( * ) Notice: Subject to any disclaimer, the term of this patent is extended or adjusted under 35 U.S.C. 154(b) by 568 days.

(21) Appl. No.: 11/410,592

(22) Filed: Apr. 25, 2006

(65) Prior Publication Data

US 2007/0080506 A1   Apr. 12, 2007

(30) Foreign Application Priority Data

Oct. 12, 2005   (CN)   .................... 2005 1 0108352
Dec. 2, 2005    (CN)   .................... 2005 2 0142720 U

(51) Int. Cl.
    *B23B 31/16* (2006.01)
(52) U.S. Cl. .................... 279/62; 279/125; 279/157; 279/902
(58) Field of Classification Search ............ 279/61, 279/62, 125, 157, 902, 60; *B23B 31/16*
    See application file for complete search history.

(56) References Cited

U.S. PATENT DOCUMENTS

| | | | |
|---|---|---|---|
| 66,081 A | 1/1867 | Harris et al. | |
| 4,094,523 A | 6/1978 | Derbyshire | |
| 4,127,227 A | 11/1978 | Green | |
| 4,284,285 A | 8/1981 | Futter | |
| 4,381,116 A | 4/1983 | Futter | |
| 4,648,608 A | 3/1987 | Smith | |
| 4,775,269 A | 10/1988 | Brix | |
| 4,840,387 A | 6/1989 | McCarthy | |
| 4,848,779 A | 7/1989 | Wheeler et al. | |
| 4,958,840 A * | 9/1990 | Palm | 279/62 |
| 4,968,191 A * | 11/1990 | Palm | 408/124 |
| 5,009,439 A | 4/1991 | Sakamaki | |
| 5,044,643 A | 9/1991 | Nakamura | |
| 5,125,673 A | 6/1992 | Huff et al. | |
| 5,145,193 A | 9/1992 | Rohm | |
| 5,172,923 A | 12/1992 | Nakamura | |
| 5,253,879 A | 10/1993 | Huff et al. | |
| 5,261,679 A | 11/1993 | Nakamura | |
| 5,330,204 A | 7/1994 | Huff et al. | |

(Continued)

FOREIGN PATENT DOCUMENTS

FR   2847181   5/2004

(Continued)

*Primary Examiner*—Eric A Gates
(74) *Attorney, Agent, or Firm*—Hoffmann & Baron, LLP

(57) ABSTRACT

A chuck is provided for use with a manual or powered driver. The chuck has a body with angularly disposed passageways. A plurality of jaws is slidably positioned within the angularly disposed passageways. A nut is rotatably mounted about the body member and has threads defined on an inner circumference that engage jaw threads. A sleeve is in driving rotational engagement with the nut so that when the sleeve is rotated with respect to the body, the jaws are moved within the passageways. A stopping mechanism that rotates with the sleeve is provided with at least one elastic stop pawl. When the stopping mechanism rotates in a first direction that causes the gripping jaws to move to the rear of the body to a predetermined position, the stop pawl blocks the lateral surface of the gripping jaws and prevents further rotational movement of the nut.

24 Claims, 11 Drawing Sheets

U.S. PATENT DOCUMENTS

| | | | |
|---|---|---|---|
| 5,348,318 | A | 9/1994 | Steadings et al. |
| 5,431,419 | A | 7/1995 | Mack |
| 5,452,906 | A | 9/1995 | Huff et al. |
| 5,458,345 | A | 10/1995 | Amyot |
| 5,499,828 | A | 3/1996 | Salpaka et al. |
| 5,501,473 | A | 3/1996 | Barton et al. |
| 5,503,409 | A | 4/1996 | Rohm |
| 5,553,873 | A | 9/1996 | Salpaka et al. |
| 5,573,254 | A | 11/1996 | Huff et al. |
| 5,704,616 | A * | 1/1998 | Huff et al. ............... 279/62 |
| 5,709,392 | A | 1/1998 | Barton et al. |
| 5,732,956 | A | 3/1998 | Huff et al. |
| 5,741,016 | A | 4/1998 | Barton et al. |
| 5,765,839 | A | 6/1998 | Rohm |
| 5,788,248 | A | 8/1998 | Gibson |
| 5,816,583 | A | 10/1998 | Middleton |
| 5,833,247 | A | 11/1998 | Deushle et al. |
| 5,846,036 | A | 12/1998 | Mizoguchi |
| 5,913,524 | A * | 6/1999 | Barton ............... 279/62 |
| 5,924,702 | A | 7/1999 | Huff et al. |
| 5,951,026 | A | 9/1999 | Harman, Jr. et al. |
| 5,957,469 | A | 9/1999 | Miles et al. |
| 5,988,653 | A | 11/1999 | Kuo |
| 5,992,859 | A | 11/1999 | Lin |
| 6,045,303 | A | 4/2000 | Chung |
| 6,047,971 | A | 4/2000 | Harman, Jr. et al. |
| 6,070,884 | A * | 6/2000 | Mack ............... 279/62 |
| 6,079,716 | A | 6/2000 | Harman, Jr. et al. |
| 6,168,170 | B1 * | 1/2001 | Miles et al. ............... 279/62 |
| 6,179,301 | B1 | 1/2001 | Steadings et al. |
| 6,196,554 | B1 | 3/2001 | Gaddis et al. |
| 6,241,259 | B1 | 6/2001 | Gaddis et al. |
| 6,241,260 | B1 | 6/2001 | Judge et al. |
| 6,247,706 | B1 | 6/2001 | Kuo |
| 6,257,596 | B1 | 7/2001 | Yang |
| 6,260,856 | B1 | 7/2001 | Temple-Wilson |
| 6,260,857 | B1 | 7/2001 | Wienhold et al. |
| 6,279,918 | B1 | 8/2001 | Barton et al. |
| 6,286,842 | B1 | 9/2001 | Huff et al. |
| 6,293,559 | B1 | 9/2001 | Harman, Jr. et al. |
| 6,296,257 | B1 | 10/2001 | Huff et al. |
| 6,354,605 | B1 | 3/2002 | Aultman |
| 6,390,481 | B1 | 5/2002 | Nakamuro |
| 6,428,018 | B1 | 8/2002 | Aultman et al. |
| 6,474,657 | B1 | 11/2002 | Fan-Chiang et al. |
| 6,488,286 | B2 | 12/2002 | Yaksich |
| 6,488,287 | B2 | 12/2002 | Gaddis et al. |
| 6,505,840 | B2 | 1/2003 | Huggins et al. |
| 6,517,088 | B1 | 2/2003 | Rohm |
| 6,517,295 | B2 | 2/2003 | Lin |
| 6,533,291 | B2 | 3/2003 | Huggins et al. |
| 6,540,236 | B2 | 4/2003 | Aultman et al. |
| 6,540,237 | B1 | 4/2003 | Temple-Wilson |
| 6,551,037 | B2 | 4/2003 | Gifford et al. |
| 6,554,289 | B1 | 4/2003 | Lin |
| 6,572,310 | B2 | 6/2003 | Temple-Wilson |
| 6,575,478 | B2 * | 6/2003 | Rohm et al. ............... 279/62 |
| 6,581,942 | B2 | 6/2003 | Rohm |
| 6,648,341 | B1 | 11/2003 | Gaddis |
| 6,648,342 | B2 | 11/2003 | Aultman et al. |
| 6,659,474 | B2 | 12/2003 | Sakamaki et al. |
| 6,669,207 | B2 | 12/2003 | Huff et al. |
| 6,688,610 | B2 | 2/2004 | Huggins et al. |
| 6,722,668 | B2 | 4/2004 | Huggins et al. |
| 6,729,812 | B2 | 5/2004 | Yaksich et al. |
| 6,736,410 | B2 | 5/2004 | Barton et al. |
| 6,824,141 | B1 | 11/2004 | Sakamaki et al. |
| 6,832,764 | B2 | 12/2004 | Steadings et al. |
| 6,834,864 | B2 | 12/2004 | Girardeau |
| 6,843,484 | B2 | 1/2005 | Schroeder |
| 6,843,485 | B2 | 1/2005 | Sakamaki et al. |
| 6,848,691 | B2 | 2/2005 | Yang et al. |
| 6,851,678 | B2 | 2/2005 | Mack |
| 6,860,488 | B2 | 3/2005 | Mack |
| 6,883,809 | B2 | 4/2005 | Rohm |
| 6,889,986 | B2 * | 5/2005 | Rohm ............... 279/62 |
| 6,902,171 | B2 | 6/2005 | Sakamaki et al. |
| 6,902,172 | B2 | 6/2005 | Rohm |
| 6,921,092 | B2 | 7/2005 | Mack |
| 6,924,702 | B2 | 8/2005 | Chen |
| 6,959,931 | B2 | 11/2005 | Sakamaki et al. |
| 2003/0189299 | A1 | 10/2003 | Huggins et al. |
| 2004/0094907 | A1 | 5/2004 | Huff et al. |
| 2004/0135325 | A1 | 7/2004 | Cachod et al. |
| 2004/0195784 | A1 | 10/2004 | Hoffmann |
| 2004/0202518 | A1 | 10/2004 | Yaksich et al. |
| 2004/0217558 | A1 | 11/2004 | Yang et al. |
| 2004/0251641 | A1 | 12/2004 | Hoffmann et al. |
| 2005/0023774 | A1 | 2/2005 | Mack |
| 2005/0077690 | A1 | 4/2005 | Cachod et al. |
| 2005/0161890 | A1 | 7/2005 | Yang et al. |
| 2005/0242531 | A1 | 11/2005 | Young |

FOREIGN PATENT DOCUMENTS

| | | |
|---|---|---|
| GB | 2236968 | 5/1991 |

* cited by examiner

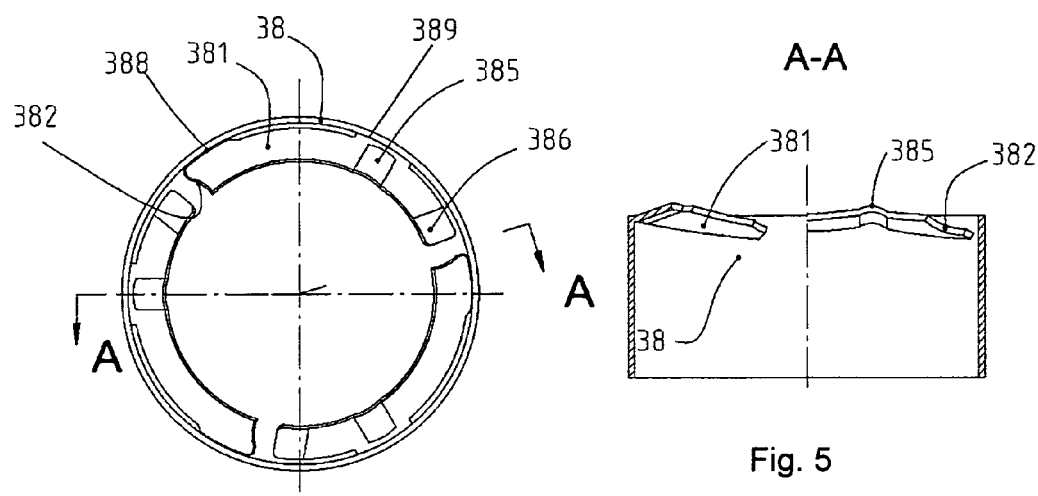
Fig. 4
Fig. 5
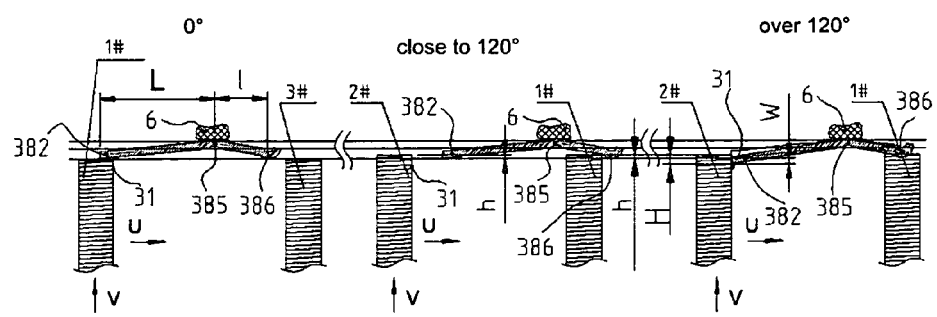
Fig. 6   Fig. 7   Fig. 8

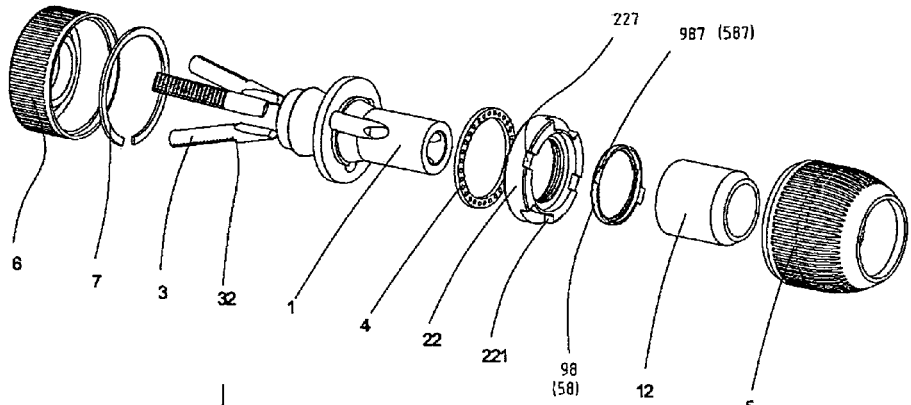
Fig. 33
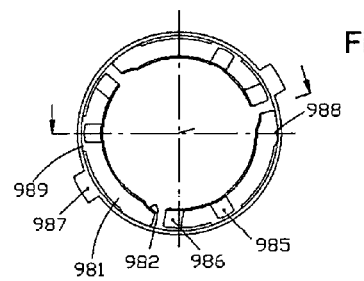
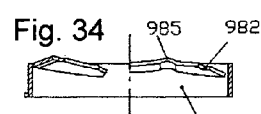
Fig. 34
Fig. 35
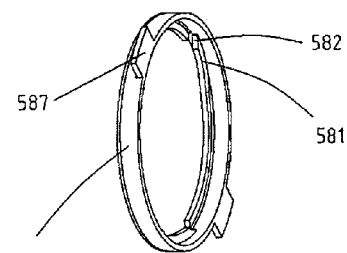
Fig. 39
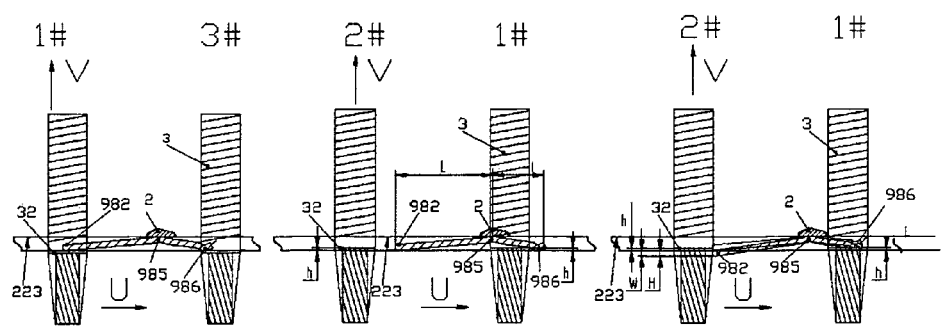
Fig. 36
Fig. 37
Fig. 38

CHUCK WITH GRIPPING MECHANISM STOP

The present application claims priority to CN 200510108352.X filed Oct. 12, 2005 and to CN 200520142720.8 filed Dec. 2, 2005, the entire contents of which are incorporated herein by reference.

The present invention relates to a chuck with a gripping mechanism stop. In particular, the present invention relates to a chuck with a stopping mechanism for stopping rearward movement of the jaws. The stopping mechanism prevents the jaws from continuing to rotate relative to the nut and thus prevents excessive friction and immovability between the ending plane surface of the jaw threads and the circular ending surface of the threads in the nut.

BACKGROUND

Chucks are used used to clamp various types of rotating tools, for example, drill bits, reamers, screw taps, etc. Typical chucks include a body, jaws (typically, three), nut, and outer housings, etc., and sometimes they also include a back sleeve. In addition, some chucks include bearings and bearing gaskets that are used for decreasing friction. The housing and bearing gasket are separately tightly fitted with the body. The jaws are installed in the equally divided slant holes in the body. The nut is placed around the body and its interior has threads that interact with the jaws to form a thread drive gear. The housing is jacketed over the nut (in some situations, there is also a nut sleeve jacketed over the nut). There is a key on the housing and there is a key slot corresponding to the key on the nut to enable the housing to connect through the key and nut sleeve (nut).

The outer sleeve can be manually rotated during usage to drive the nut sleeve and/or nut to cause the jaws to move forward and backwards in the slant holes of the body and to cause the jaws to open or close with respect to the rotating tool.

The jaws of this type of clamping chuck have a thread section formed by cutting along a lateral surface, and the front end of this thread section has a thread terminal end plane. When the nut is rotated in the loosening direction and the gripping jaws drive toward the back until near the extreme position, the terminal end plane of the threads of the gripping jaws rubs against and joins with the thread end of the nut, and they are pressed close to each other. Further rotation of the nut causes transitional extrusion of the two surfaces and produces very great friction. As a result, when the nut is rotated in the tightening direction in order to tighten the tool, it is necessary to first overcome this friction which makes usage inconvenient and sometimes there can even be jamming. In addition, this friction can also increase the wear of the thread and thus influence the usage lifetime of the clamping chuck.

U.S. Pat. No. 5,913,524 discloses a clamp head with a clamp mechanism stop part. As shown in FIG. 49, there is an arresting section 2'a on nut 2' that can rotate with the nut, and this arresting section 2'a extends in the axial direction of the gripper body. When the rotation of nut 2' in the loosening direction causes gripping jaws 3' to reach a certain predetermined position in the slanted hole, arresting section 2'a comes close to gripping jaws 3' in the rotating direction and prevents nut 2' from further rotating in the loosening direction.

Chinese patent No. 99101282.8 (Publication No. CN1097503C) discloses a chuck with a jaw stop apparatus. As shown in FIG. 50, the chuck includes a rotating lock gear installed between the nut 2' and the jaws 3'. When the jaws 3' reach a predetermined position in the slanted hole, the nut 2' is prevented from further rotating in the loosening direction. The rotating lock gear includes a radial extending surface 2'a of the limited nut thread end, and the radial surface comes into contact with the lateral surface 3'a of a jaw 3.

SUMMARY

The present invention provides a stopping mechanism. The chuck includes body with its back end connected to the drive shaft. The body has slanted holes evenly divided along the circumference to receive a respective jaw, each of which has threads on the outside surface. A nut is rotatably mounted on the body to threadedly engage the threads on the jaws. A sleeve may surround the body and is connected with and drives the nut. In one embodiment, the stopping mechanism at least partially surrounds the body so that it synchronously rotates with the sleeve. When the outer sleeve rotates in a first direction, i.e., the loosening direction, so that the jaws retreat into the body, at a particular position the stopping mechanism stops further rearward movement of the jaws. In one embodiment, the stopping mechanism has at least one elastic stop pawl that contacts a lateral side of the jaw. In one embodiment, the lateral side of the jaw that comes into contact with the stop pawl has a plane stopping section.

In one embodiment the stopping mechanism includes a stop holder installed on the bottom end of the nut. The stop pawl is supported on the lateral surface of the jaws located on the bottom section of the thread terminal end plane. The stop holder may have a convex key that extends outward in the radial direction. The bottom end of the nut has a corresponding concave groove so that respective engagement of the convex key and concave groove connect the stop holder and the nut.

The back end of the stop holder has a top section. One end of the stop pawl has a connecting section that joins with the top section and the other end of the stop pawl includes a stop section that extends along a direction and slants forward. In one embodiment, the stop pawl is formed monolithically as part of the stop holder. The stop holder may be tightly fit on the nut.

In one embodiment, the stop pawl extends inwards and is formed from the back end of the stop holder. The stop pawl includes a connecting section that is situated in the middle portion of the said stop pawl, and it forms into a whole or is fixed and connected with the stop holder. The stopping section is located on the stop pawl facing the side of the first direction of the said connecting section and it is used to block the lateral surface of the gripping jaw. The lever section is located on the stop pawl facing the side of the second direction of the connecting section and the second direction is opposite of the said first direction.

The stop pawl may also include an outer side support section located on the outer side of the stop pawl corresponding to the stopping section. It is used for support on the inner surface of the stop holder when the stopping section sustains pressure so as to support the stopping section. The stop pawl may also include a protruding section located on the stop pawl and in the middle position corresponding to the connecting section. The protruding section upwards and comes into contact with the circular cut-off plane in the bottom end thread of the nut. The stop holder can be an open shape. The end of the lever section kinks upwards and forms an inclined plane.

Another aspect of the present invention provides a chuck with a body having an end connected to the drive source. The body has slant holes evenly divided to receive a jaw that is separately installed in corresponding slant holes. A nut is rotatably mounted about the body and it has threads on its inner surface that joins with threads on the jaws. A sleeve is mounted about the body and it is connected to and drives the nut. The stopping mechanism is provided to synchronously rotate with the nut. The stopping mechanism has at least one elastic stop pawl on the top so that as the jaws move back to a predetermined position, the stop pawl blocks the lateral surface of the said gripping jaws.

Another aspect of the present invention provides chuck that includes a body having an end connected to the drive source. The body has slanted holes evenly divided to receive corresponding jaws having an outer surface with threads. A nut is rotatably provided about the body and it has an inner surface with threads that engage the threads of the jaws. A sleeve is connected to and drives the said nut. A stopping mechanism with at least one elastic stop pawl may be provided. When the housing is rotated along a first direction to cause the jaws to go back to a predetermined position, the stop pawl blocks the lateral surface of the jaws. The stopping mechanism may be in the form of an arresting disk. The free end of the said stop pawl may define a stopping section that extends along a first direction and slants forward. The end section of the stopping section has a concave cambered surface that matches with the lateral surface of the jaws.

The stopping mechanism desirably includes an elastic stop pawl so that the chuck can provide a reliable stopping effect when stopped. In addition, the pawl can utilize the elastic recovery force to restore the original position when it rotates in the clamping direction from the stop position to prevent or minimize the frictional joining of the thread terminal end plane of the jaw and the end surface of the nut (or thread end surface) and effectively avoid the friction and jamming resulting from transitional extrusion of the two surfaces.

In one embodiment, the stopping mechanism is provided as a sleeve with at least one stopping pawl formed by extending inward from the rear end of the sleeve. The pawl may include a connecting part, a stop part, and a lever part. The connecting part is located in the middle and is integral to or fastened onto the stop sleeve. The stop part is located on the side of the first direction relative to the connecting part and is used to stop the lateral surface of the jaws. The lever part is located on the side of the second direction of the connecting part relative to the stop part and the second direction is opposite the first direction.

In another embodiment, the stopping mechanism is a stop sleeve having a rear end with a top. One end of the stop pawl has a connecting part connected to the top, while the other end has a stop part that extends along the first direction and that inclines forward. The stop pawl may be monolithic with the stop sleeve. The stop sleeve may be fastened onto the nut. The stop pawls may also include an outer lateral supporting part.

The chuck may also include a rear sleeve having a rear end that is fastened and connected to the rear end of the body. The stop pawls may include a protruding part located at a central location on the stop pawls that corresponds to the connecting part. The protruding part extends upward and can contact the inner end plane of the rear sleeve. The end part of the lever part bends upwards to form an oblique plane.

Either the stop sleeve or the outer sleeve has a key, and the other has a groove such that the key and the groove match each other and connect the stop sleeve to the outer sleeve.

The stopping mechanism is in the form of a sleeve with stop pawls distributed on the lateral walls of the sleeve. The pawls including a stopping part, a connecting part, and a lever part. The stopping part is located in the lower part of the stop pawls and extends radially inward. The stopping part is used to stop the lateral surface of the jaws through its lateral surface. The connecting part is used for connecting the stop pawls to the body of the stop sleeve. The lever part is located at the top of the stop pawls and extends radially inward. The lever part contacts the rear end of the pawls causing the stop pawls to swing under the support of the rear end of the jaws.

The connecting part is an elastic rotating arm located in the upper part of the stop pawls and is used to connect to the body of the stop sleeve to enable the stop pawls to rotate around it and to generate the elastic recovery force necessary for the stop pawls to be reset. On either side of the stop pawls, there is an elastic rotating arm respectively connected to the body of the stop sleeve. The stop part of the stop pawls is an arc bending structure that extends and protrudes laterally inward, and its lower side may be leaned against the lateral walls of the adjacent stop sleeve. The lever part forms a bias along the first direction described relative to the body of the stop pawls. One end of it is connected to the body of the stop pawls while the other end is a free end, to be used for contacting the rear end of the jaws.

The stop pawls can be a separate part and can be pivotally connected to the body of the stop sleeve. The connecting part of the stop pawls has pivot holes and the connecting part is connected to the body of the stop sleeve with support of the pivot. The pivot can include metal circles that surround the stop sleeve. The metal circles may have rings with openings. The lever part forms a bias along the first direction relative to the body of the stop pawls. One end of the lever part is connected to the body of the stop pawls while the other end is a free end, whose middle part protrudes downward to be used for contacting the rear end of the jaws. The rear end of the stop sleeve extends inward in a radial direction relative to the free end of the lever part of the stop pawls to form a stop part, used to stop the free end.

In one embodiment, the stopping mechanism is in the form of a sleeve. The sleeve may include a nut sleeve and a stop disc. The stop pawls are located on the stop disc. The nut sleeve is fastened and slid onto the nut. The nut sleeve has a rear end with a plurality of convex keys. The stop disc includes a plurality of corresponding concave grooves to match the convex keys to connect the nut sleeve and the stop disc. The chuck may include a rear cover or sleeve. The rear cover has grooves that match the convex keys and that fasten the stop disc to the nut sleeve through the rear cover. The rear cover may have a flange to connect to the outer sleeve in order to locate the nut sleeve and the stop disc axially. The outer sleeve, nut, nut sleeve, stop disc, and rear cover can simultaneously rotate with the body.

In another embodiment, the stopping mechanism is a sleeve located at the lower end of the nut. The stop sleeve can be open-shaped. The stop pawls are pushed against the lower lateral surface of the plane at the thread end of the jaws. The stop sleeve has convex keys that extend radially outward. The lower end of the nut has corresponding concave grooves, which connect the stop sleeve with the nut through the convex keys and concave grooves. The rear end of the stop sleeve may include a top.

One end of the stop pawls includes a connecting part connected to the top of the sleeve when provided, and the other end is a stop part that extends along the first direction and inclines forward. The stop pawls are integral or monolithic to the stop sleeve through the connecting part.

The stop pawls are formed by extending inward from the rear end of the stop sleeve, and include a connecting part, a stop part, and a lever part. The connecting part is located in the middle of the stop pawls and is integral to, fastened onto, or formed monolithically with the stop sleeve. The stop part is located on the side of the first direction relative to the connecting part on the stop pawls and is used to stop the lateral surface of the jaws. The lever part is located on the side of the second direction of the connecting part relative to the stop part on the stop pawls, and the second direction is opposite the first direction.

The stop pawls also include an outer lateral supporting part, located at a position on the outer lateral side corresponding to the stop part to be pushed against the inner surface of the stop part in order to support the stop part when the stop part is subject to force. The stop pawls also include a protruding part, located at a central location on the stop pawls that corresponds to the connecting part. The protruding part protrudes upwards and comes into contact with the circular inner end plane in the thread of the nut.

The present invention allows the chuck to provide a reliable jaw stopping effect through elastic stop pawls that are connected to an outer sleeve. Accordingly, when the outer sleeve is rotated in the clamping direction from a stopped position, the stop pawls may be reset to their original position through an elastic recovery force, thus reliably completing the jaw stopping function and preventing or minimizing the joining of the thread terminating end plane of the jaws and the thread end surface of the nut by friction and avoiding the occurrence of friction and immovability between these two surfaces resulting from excessive squeezing.

BRIEF DESCRIPTION OF THE DRAWINGS

FIG. 4 is a bottom view of the stop sleeve of the chuck according to the second embodiment of the present invention.

FIG. 5 is a cross section view of a stopping mechanism along the line A-A of FIG. 4.

FIG. 6 is a schematic to show the relative position of a jaw and a portion of the stopping mechanism as it rotates around the nut approximately 120 degrees prior to stopping.

FIG. 7 is a schematic to show the relative position of a jaw and a portion of the stopping mechanism as it rotates around the nut about the transverse dimension of a gripping jaw prior to stopping.

FIG. 8 is a schematic to show the relative position of a jaw and a portion of the stopping mechanism as it rotates around the nut to the stopped state.

FIG. 33 is an exploded view of a chuck according to a seventh embodiment of the present invention.

FIG. 34 is a bottom view of the stop holder according to the seventh embodiment of the present invention.

FIG. 35 is a cross-sectional view of the stop holder of FIG. 34.

FIG. 36 is a schematic to show the relative position of two jaws and a portion of the stopping mechanism as the jaws rotate about 120 degrees relative to the nut prior to stopping.

FIG. 37 is a schematic to show the relative position of two jaws and a portion of the stopping mechanism prior to stopping.

FIG. 38 is a schematic to show the relative position of two jaws and a portion of the stopping mechanism in the stopped position.

FIG. 39 is an exploded view of a chuck according to an eighth embodiment of the present invention.

DESCRIPTION

The chuck described in this specification can be used to clamp shaft-type tools such as drill bits, screw taps, reamers, etc., and for convenience of narration, they will generally be called tool shanks. In addition, the direction of the tool shank relative to the chuck itself will be designated the "front" and the direction of the power supply drive shaft will be designated the "back." The front may also be referred to as the "bottom," and the "back" may also be referred to as the "rear." This does not include special explanations or when it is obviously not possible to understand based on these explanations.

Figure 1:
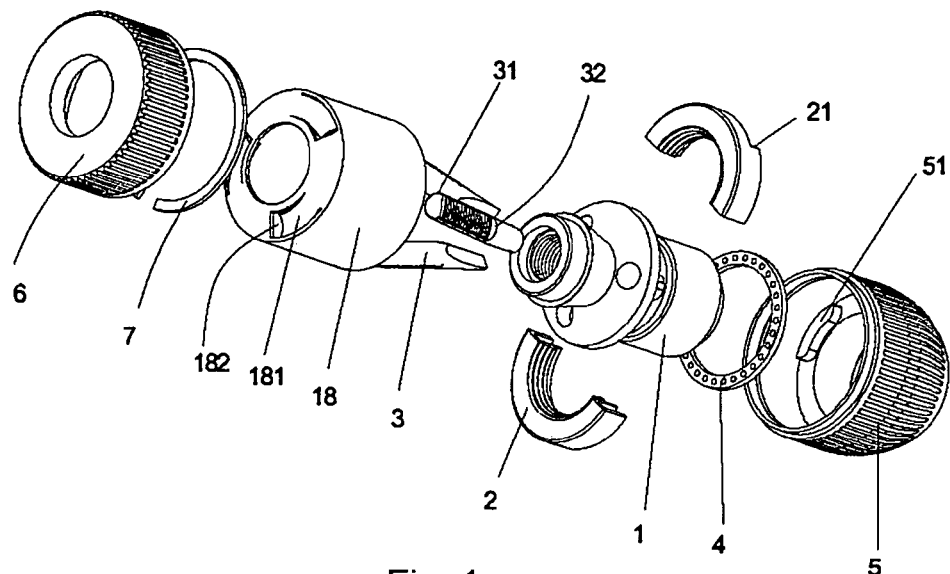
FIG. 1 is an exploded view of a chuck having a stopping mechanism according to one embodiment of the present invention.

Turning now to FIG. 1, an exploded view of one embodiment of a chuck incorporating a stopping mechanism according to the present invention is shown. The chuck includes a body 1, nut 2, a plurality of jaws 3 (three for example), a bearing 4, a front sleeve or housing 5, rear cover (or rear sleeve) 6, a positioning jump ring 7 and a stopping mechanism 18. The rear of the body 1 has an axial hole that connects with the power source drive axle. The rear sleeve or cover 6 tightly fits with the outer periphery of the body 1. The three jaws 3 are separately installed in three corresponding slanted holes divided equally along the circumference of the body 1. Each jaw has a front end defining a clamping section and an opposite end having a threaded surface. The threads end in a thread terminal end plane 32 along the forward direction.

The nut 2 has an inner surface with threads that engage the threads on the jaws 3 so that the jaws will move in an axial direction as the nut is rotated. The outer periphery of nut 2 rotates with the stopping mechanism. In one embodiment, the nut 2 is connected to the stop sleeve 18. In another embodiment, the nut 2 is fixed to the stop sleeve 18. The nut 2 may be provided with a groove 21 that corresponds to and is engaged by a key 51 on the front sleeve 5. It will be appreciated, that when the front sleeve 5 is rotated, the nut 2 drives the jaws 3 in a back and forth motion in the slant holes of the body 1 to tighten and loosen the jaws about the tool shank.

As shown in FIG. 1, the nut 2 is split. It is contemplated that a single-piece nut could be used with the stopping mechanism 18 of the present invention. Where the nut 2 is split, the stopping mechanism 18 may surround and be fixed onto the nut 2.

In the particular embodiment shown in FIG. 1, the stopping mechanism 18 includes a sleeve that is fixed on the nut 2. The rear end of the sleeve has a top section with at least one elastic stop pawl 181. FIG. 1 shows three stop pawls 181, although there can be any suitable number of stop pawls. Generally, there are as many stop pawls as jaws. Each stop pawl 181 slants and bends forward, toward the inside of the stop sleeve along a first direction (the loosening direction). One end of the stop pawl 181 defines a connecting section that joins with the back end section of stop sleeve. The other, opposite end is the free end that forms stopping section 182. The stop pawl 181 can be formed monolithically with the sleeve by means of blanking, punching, or cutting, or other techniques. The stop pawl 181 can also be fixed and joined together with the stop sleeve using other well-known connecting methods. In one embodiment, the stop pawl 181 has a laminated structure.

Figure 2:
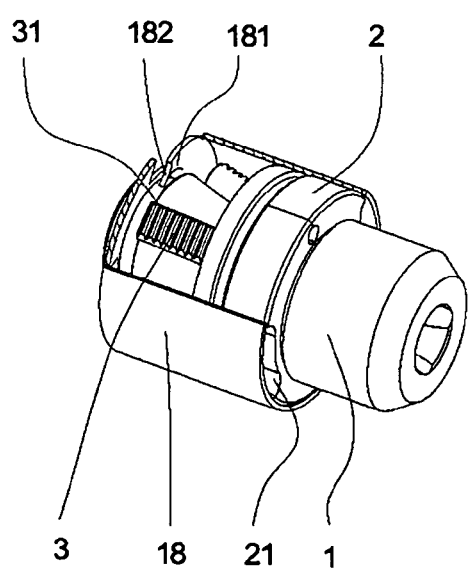
FIG. 2 is a perspective view of the chuck of the first embodiment with a portion of the chuck being cut away to better show features of the present invention.
Figure 3:
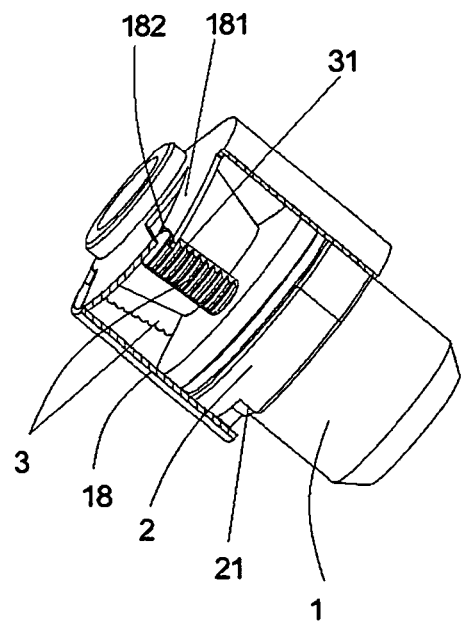
FIG. 3 is a perspective view of the chuck of the first embodiment with a portion of the chuck being cut away to better show features of the present invention and to show the stopping mechanism in an engaged condition to stop further rearward travel of the jaws.
Figure 10:
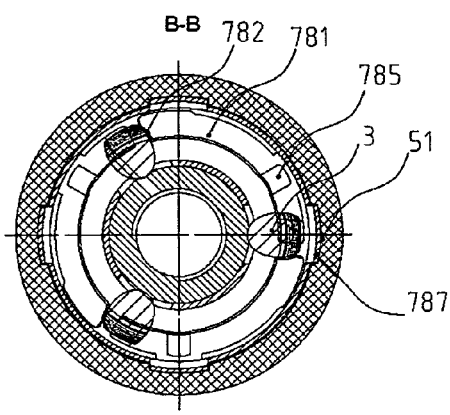
FIG. 10 is a cross sectional view of the clamping chuck along the line along the B-B of FIG. 9.
Figure 9:
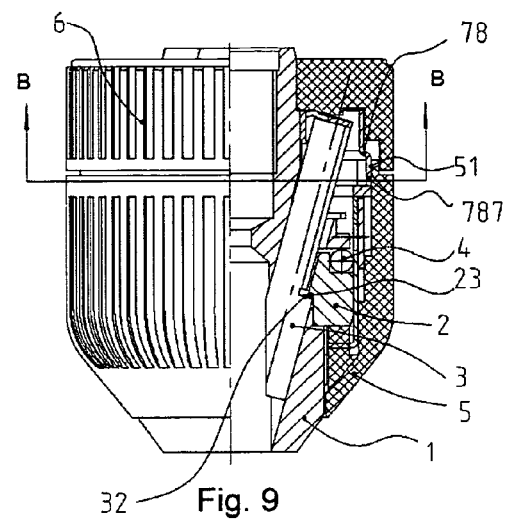
FIG. 9 is a partial cross sectional view of the chuck according to a third embodiment of the present invention.

When rotating the housing 5 along the first direction (loosening direction), the nut 2 turns with it, and while driven by the rotating nut 2 and the stop sleeve, the jaws 3 move toward the back up until the extreme position near the back end of the chuck. At this time, the terminal end plane 32 of the corresponding jaws 3 is located in a position near the annular cut-off plane 23 in the threads of nut 2. At this time, the stopping section 182 of stop pawl 181 comes into contact with lateral surface 31 of the back end of the jaws 3 that is relative to the body 1 along the circumference so as to prevent relative rotation between the nut 2 (and the stop sleeve 18) and the jaws 3 as well as to avoid having thread terminal end plane 32 of the jaws 3 come into contact with the annular cut-off plane 23 in the threads of nut 2, and extrude and produce excessively large frictional drag torque. FIG. 2 shows the stop pawl 181 in the normal or non-stopped state. FIG. 3 shows the stop pawl 181 in the stopped state.

The following situation can possibly occur during this stopping process. When the contact area of the back end side 31 of the jaws 3 and the stopping section 182 of the stop pawl is excessively small, the stop pawl 181 can produce slight yielding toward the back (elastic deformation), and it cannot effectively stop the movement and slide by the contact position of this first stop pawl 181. At this point, the jaws 3 can continue to rotate relative to nut 2 until the contact position of the next adjoining stop pawl 181 (the contact position of the second stop pawl). At this time, owing to the fact that the back end of the jaws 3 in relation to the contact position of the first stop pawl 181 moves one-third of the screw pitch in the contact position of this second stop pawl and the position of the stop pawl along the body axis direction does not change, the coinciding height of this type of lateral surface 31 of the jaws 3 and the stopping section 182 of the stop pawl will be larger than one-third of the screw pitch, and the further continuous rotation of the gripping jaws can then be reliably blocked.

FIGS. 4 through 8 show a second embodiment of the present invention. In this embodiment, the stop sleeve 18 is replaced with a stop sleeve 38. In this embodiment, the rear or back end at least one, and generally more than one stop pawls 381 along the radial direction. Typically, the number of stop pawls 381 is the same as the number of jaws 3. Each stop pawl 381 has a connecting section 389, a stopping section 382, a supporting section 388, a protruding section 385 and a lever section 386. The connecting section 389 connects the stop pawl 381 to the stop sleeve 18. The connection may be formed integrally with the stop sleeve 38, may be formed monolithically, or may be fixed or connected to the stop sleeve. The stopping section 382 is located at a free end (the side of the first direction along the relative connecting section) and is used to block the side or lateral surface of the jaws 3. The supporting section 388 is located on the outer lateral surface of the stopping section 382 and it is used to support the internal surface of the stop sleeve 38 when the stopping section 382 sustains stress. The protruding section 385 is situated in a position corresponding to connecting section 389 on stop pawl 381. It protrudes upwards and comes into contact with the end surface in the back end section of back sleeve 6. The lever section 386 is opposite the stopping section 382 (the side of the second direction in relation to the connecting section and opposite to the side of the first direction). The lever section makes make contact with the back end of a jaw 3, and therefore moves upwards with the support of a corresponding jaw.

FIGS. 6-8 illustrate the stopping principle of this chuck. In the figures, the direction of the jaws 3 rotating in relation to the nut 2 is U, and the moving direction is V. FIG. 6 shows the jaws 3 moving towards the back just before coming into contact with the end of the stopping section 382 and the lever section 386. At this time, the space between the end of three gripping jaws 3 and the end of stopping section 382 and lever section 386 is less than one-third of the screw pitch. The figure shows the first (#1) and third (#3) jaws 3. FIG. 7 shows the position of the first (#1) jaw 3 approaching and rotating 120 degrees (the difference is approximately the width of one jaw), and at this time, the end of the jaws 3 moves back a distance of h past the end of the stopping section 382 and the lever section 386. FIG. 8 shows the first (#1) and second (#2) jaws 3 ant that as jaws continue to move rearward, the back end of the second (#2) jaw) and the end of the lever section 386 of stop pawl 381 are in contact.

Under the support of the end of the first (#1) gripping jaw 3, the end of lever section 386 shifts back a distance h. The Stopping section 382 then moves forward a distance of W≈(L/1)×h with a lever action that takes protruding section 385 as the fulcrum point. At this time, the size of the overlapping part of the stopping section 382 of the stop pawl 381 and the jaw side surface 31 is H=h+W, which increases by a size W as compared to an absence of the action of lever section 386. As a result, the continued rotation of gripping jaws 3 in relation to nut 2 (and stop holder 38) is more effectively blocked. The function of outer lateral surface 388 of the stop pawl 381 on stop sleeve 38 is to provide a type of auxiliary support when jaws 3 make contact with the stop section 382, thus applying a greater force thereon and producing a slight shift in position approaching the interior lateral wall of stop sleeve 38.

As shown in FIGS. 4 and 5, the stopping contact side of the stopping section 382 may have a shape the same as that of the lateral surface of the jaws 3. Under ordinary conditions, the lowest position of stopping section 382 is located at the same horizontal position as the lowest position of the lever section 386 and is lower than the middle position of the stop pawl 381. The end of the lever section 386 bends upwards to form a slanted or oblique surface that makes it easier for the end of the jaws 3 to slide or slip over the lever section 386 when the outer sleeve is rotated in the tightening direction. Desirably, the protruding section 385 is an upward arched or arc protuberance.

Figure 11:
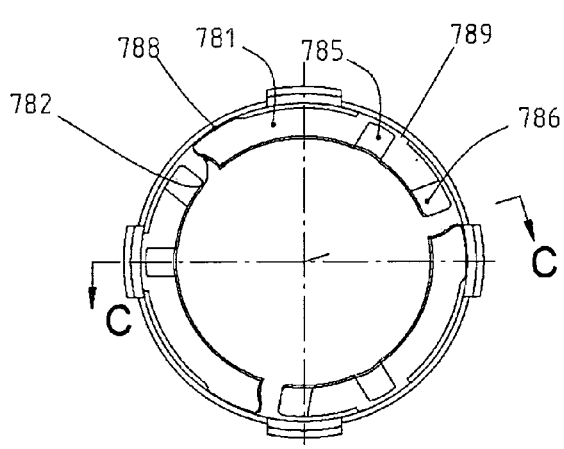
FIG. 11 is bottom view of the stop holder according to the third embodiment of the present invention.
Figure 12:
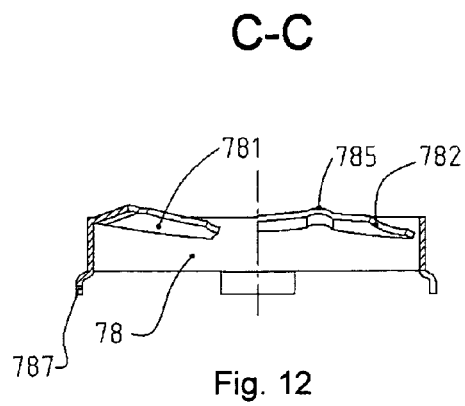
FIG. 12 is a cross sectional view of the stop holder of FIG. 11 along line C-C.
Figure 15:
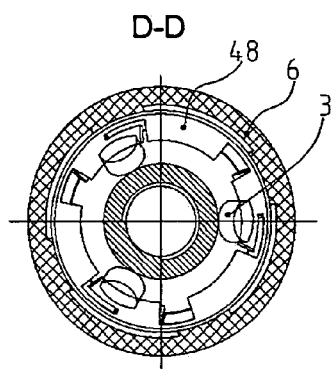
FIG. 15 is a cross sectional view of the clamping chuck of FIG. 13 along line D-D.
Figure 13:
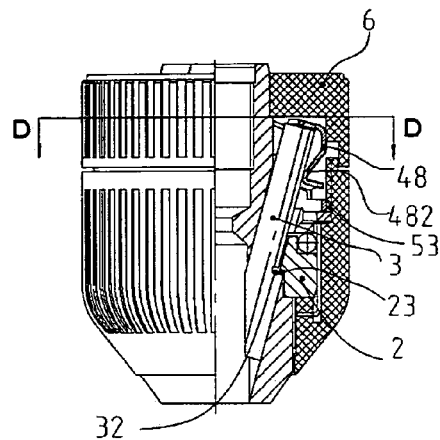
FIG. 13 is a partial cross sectional view of the chuck according to a fourth embodiment and showing the stopping mechanism in a position close to the stop state.
Figure 16:
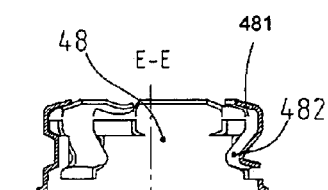
FIG. 16 is a cross-sectional view of the stop holder according to the fourth embodiment of the present invention.

FIGS. 9-12 show a chuck according to a third embodiment of the present invention. In this embodiment, a stop ring 78 is provided. The stop ring 78 is connected with the outer sleeve 5. The inner surface of the housing 5 has a groove 51. As shown in FIGS. 11 and 12, the stop ring 78 is similar to the stop sleeve 38. The stop ring 78 has at least one stop pawl 781 and desirably a number of stop pawls 781 equal to the number of jaws. Each stop pawl jaw 781 has a connecting section 789, a stopping section 782, an outer side support section 788, a protruding section 785, and a lever section 786. Stop ring has 78 has at least one, and desirably a plurality of keys 787 that extend outward along the radial direction. The key 787 connects with the groove 51 of the housing 5. The keys 787 are situated on the bottom end of the stop ring 78 and are generally formed as downward extending protuberances.

FIGS. 13-21 show a chuck according to a fourth embodiment of the present invention. In this embodiment, the stop ring 48 is used instead of stop sleeve 18. The stop ring 48 has at least one, and desirably a plurality of stop pawls 481 provided on the side wall of the stop ring 48. Each stop pawl has a stopping section 482 and an elastic pivoting arm 485, and a lever section 486. The stopping section 482 is located at a lower part the stop pawl 481 and it has an arched curved structure extending and protruding towards the inside. The lateral surface of the stopping section 482 blocks the lateral surface of the jaws 3. The bottom side of the stopping section 482 can rely upon the side wall of the stop ring 48 to provide adequate support strength and to ensure the stopping effects of the lateral surface of the jaws 3. The elastic pivoting arm 485 is situated on the upper portion of the stop pawl 481. The arm 485 is used to connect to the body of stop ring 48 so that the stop pawl 481 can pivot about the stop ring 48 and produce elastic restoring power so that stop pawl 481 can be reset. The lever section 486 is situated in the top section of stop pawl 481 and it is offset along the first direction (loosening direction) relative to the body of stop pawl 481. One end of the lever section 486 is connected with the body of stop pawl 481, while the other end is free to make contact with the back end of the jaws 3, and thus shifts upwards upon rearward action of the jaws so that the stop pawl pivots.

Figures 17, 18:
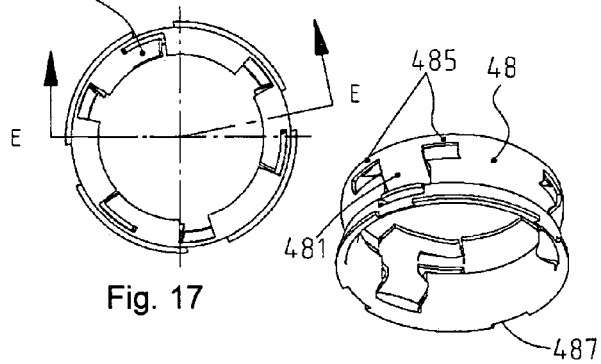
FIG. 17 is a top view of the stop holder of FIG. 16.
FIG. 18 is a perspective view of the stop holder of FIG. 16.
Figure 14:
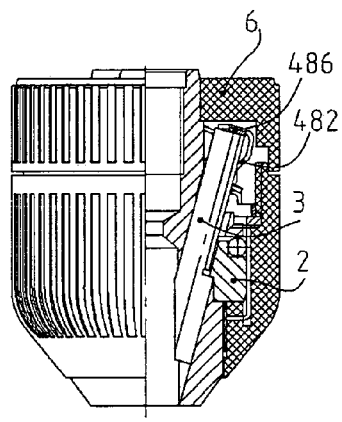
FIG. 14 is a partial cross sectional view of the chuck according to a fourth embodiment and showing the stopping mechanism in the stopped position.

In addition, as shown in FIG. 18, the bottom end of the stop ring 48 has a flange extending in a radial direction and towards the outside. The stop ring and desirably the flange has grooves 487 that receive corresponding keys 53 formed on the inner surface of the sleeve so that rotation of the sleeve 5 can rotatingly drive the stop ring 48. Naturally, the stop ring 48 and the housing 5 can be connected by other suitable structures.

Figure 19:
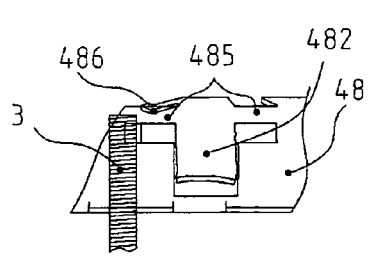
FIG. 19 is a schematic to show the relative position of a jaw and a portion of the stopping mechanism under normal conditions.
Figure 20:
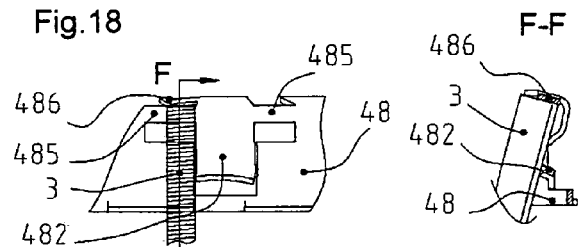
FIG. 20 is a schematic to show the relative position of a jaw and a portion of the stopping mechanism in a stopped state.
Figure 21:
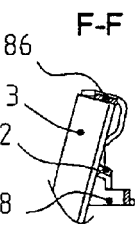
FIG. 21 is a cross sectional along the line F-F of FIG. 20 to show the relative position of a jaw and a portion of the stopping mechanism in the stopped state.
Figure 23:
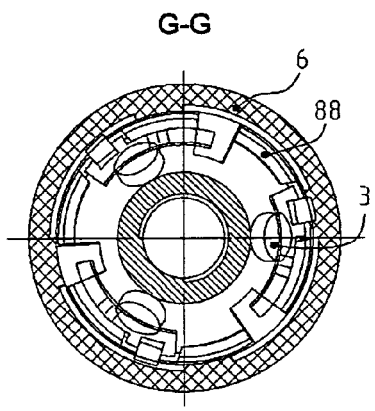
FIG. 23 is a cross-sectional view of the chuck of FIG. 22 along the line G-G.
Figure 22:
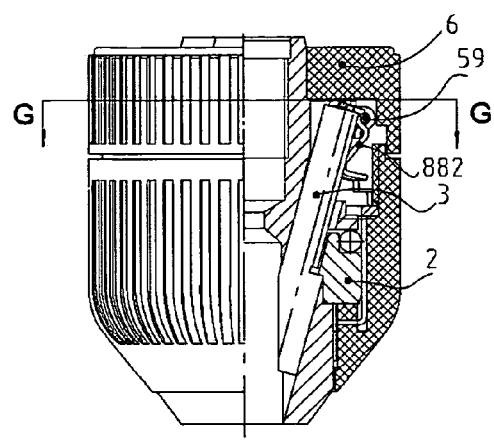
FIG. 22 is a partial cross sectional of a chuck according to a fifth embodiment of the present invention and showing the jaw in a stopped position.
Figure 24:
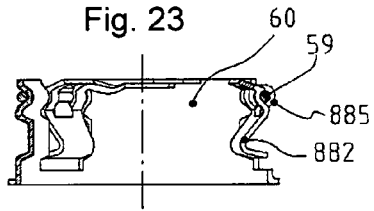
FIG. 24 is a cross-sectional view of the stop holder according to the fifth embodiment of the present invention.
Figure 25:
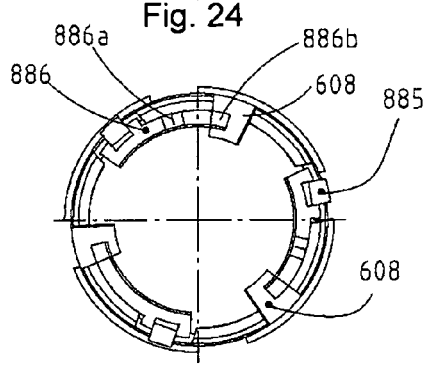
FIG. 25 is a top view of the stop holder of FIG. 24.
Figure 26:
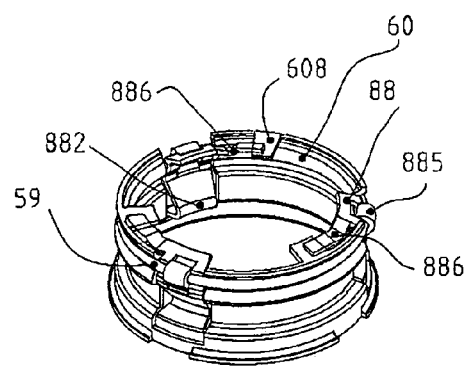
FIG. 26 is a perspective view of the stop holder of FIG. 24.

FIGS. 19-21 schematically show the operation of the chuck of this embodiment. FIG. 19 is a schematic of the relative positions of the jaws and the stop ring under normal conditions. At this time, the jaws 3 move backwards until coming into contact with the lever section 486 of stop pawl 481. FIG. 20 is a schematic of the relative positions of the jaws and the stop ring under stopped conditions. At this time, the back end of the jaws 3 pushes the lever section 486 upwards so that the stop pawl 481 rotates around elastic pivoting arm 485 and drives the stopping section 482 on the bottom of stop pawl 481 to pivot in a radial direction towards the inside, to that the lateral side of the stopping section is used to block the lateral surface of the jaws 3 to prevent the further rotation of the stop pawl 481. FIG. 21 is a local, sectional schematic along line F-F of FIG. 20, and it shows the relative positions of the jaws 3 and the stop holder 48 along the radial direction under the stopped condition. When there is reverse rotation of the sleeve 5, the back end of the jaws 3 and the lever section 486 move out of contact and the elastic restoring force of the elastic pivoted arm pivots the stopping section 482 back to its normal position, as shown in FIG. 19.

FIGS. 22-29 show a chuck with a stopping mechanism according to a fifth embodiment of the present invention. In this embodiment, there is a stop ring 60 and at least one and desirably a plurality of individual stop pawls 88. Each stop pawl 88 has a connecting section 885 on top, a stopping section 882 situated on the bottom, and a lever section 886 situation on one side of the top. The connecting section 885 includes a pivot hole by means of buckling. This pivot hole matches with a pivot 59 and connects the stop pawl 88 on the stop ring 60. The middle of the lever section 886 has a protuberance 886a that goes downward that is contacted by the back end of the jaws 3 as well as to produce elastic deformation so that the stopping section 882 can pivot in a radial direction towards the inside.

The pivot 59 can be composed from a circular cross section metal ring encircling the outer surface of the stop ring 60, and correspondingly, the outer surface of the stop ring 60 has a circular recess so as to install the metal ring. The selectable metal ring can be a sealed ring and it can also be an open ring. The top section of stop holder 60 is also installed with a circular flange that extends in a radial direction towards the inside, and it can also be a flange formed in a position relative to the free end of lever section 886 so as to form blocking section 608 to block free end 886b of lever section 886. It is to be understood that this blocking section 608 is not necessary; in which case, the inner surface of the back end section of the rear sleeve 6 may be relied upon to stop the free end 886b of the lever section 886.

Figure 27:
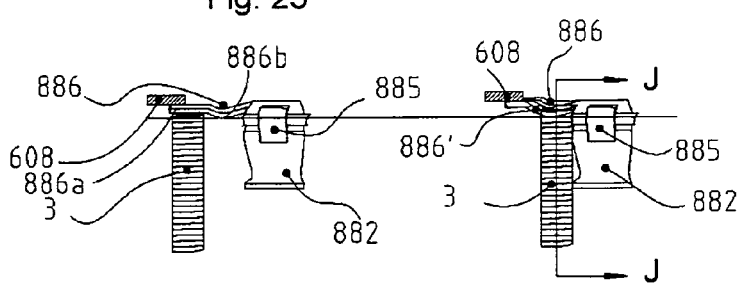
FIG. 27 is a schematic to show the relative position of a jaw and a portion of the stopping mechanism under normal conditions.
Figure 28:
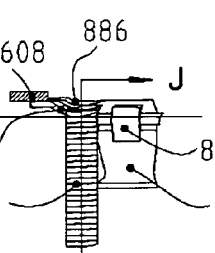
FIG. 28 is a schematic to show the relative position of a jaw and a portion of the stopping mechanism in a stopped state.
Figure 29:
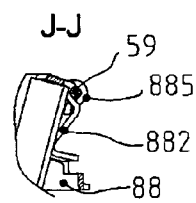
FIG. 29 is a cross sectional view along the line J-J of FIG. 28 to show the relative position of a jaw and a portion of the stopping mechanism in a stopped state.

FIGS. 27 and 28 schematically show the operation of the chuck of this embodiment. FIG. 27 is a schematic of the relative position of the jaws and the stop holder under normal conditions. At this time, the jaws 3 move backwards until they come into contact with the protuberance 886a and the free end section 886b comes into contact with the bottom surface of blocking section 608. FIG. 28 is a schematic of the relative position of the jaws and the stop holder under stopped conditions. At this time, the back end of the jaws 3 supports the protuberance 886b so that the lever section 886 elastically deforms and shifts upwards. The fine dotted line indicated by 886' in the figure is the lever section 886 and its protuberance 886a that has still not been pushed up by the back end surface of the jaws. FIG. 29 is a local sectional schematic along line J-J of FIG. 28 that shows the relative position of the jaws 3 and the stop ring 60 along the radial direction under stopped conditions. The pivoting towards the inside along the radial direction of the stopping section of the stop pawl 88 can be observed and this causes its lateral surface to block the lateral surface of gripping jaws 3. The elastic restoring force produced from the contact of lever section 886 and blocking section 608 of stop holder 60 can restore the position of stop pawl 88.

Figure 30:
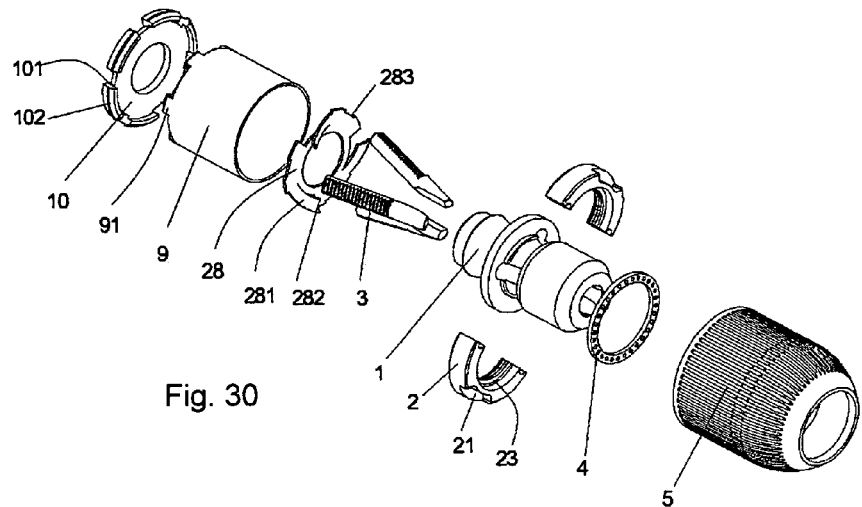
FIG. 30 is an exploded view of a chuck according to a sixth embodiment of the present invention.
Figure 31:
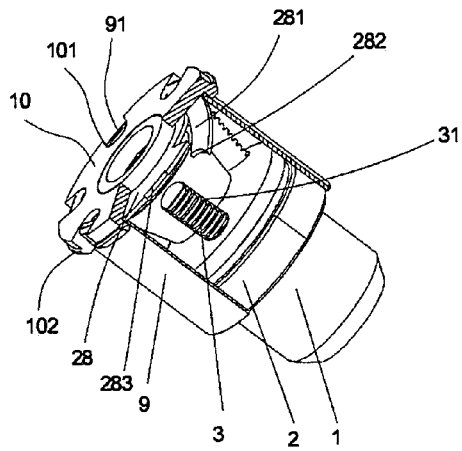
FIG. 31 is a perspective view of the chuck of the sixth embodiment with a portion of the chuck being cut away to better show features of the present invention.
Figure 32:
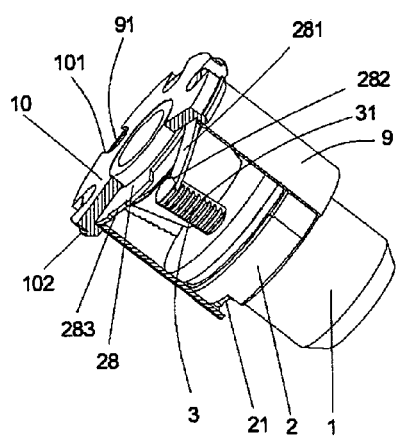
FIG. 32 is a perspective view of the chuck of the sixth embodiment with a portion of the chuck being cut away to better show features of the present invention.

FIGS. 30-32 show a chuck with a stopping mechanism according to a sixth embodiment of the present invention. In this embodiment, the stopping mechanism includes a nut cover 9 and an arresting disk 28. The nut cover 9 is fitted on nut 2, and its back end includes at least one and desirably a plurality of axial convex keys 91. The arresting disk 28 has at least one and desirably a plurality of corresponding concave grooves 283 formed on the outer circumference that fit with the convex key 91 to connect the arresting disk 28 and the nut cover 9.

A back cover 10 is provided with a groove 101 that fits with the convex key 91 and fixes the arresting disk 28 on the nut cover 9. The back cover 10 also has a flange 102 to connect the corresponding structure of the sleeve 5 (for example, the flange along the inner surface) and to fix the position of said nut cover 9 and the arresting disk 28 along the axial direction. There is a hole in the middle of the back cover 10 which allows rotational movement with the outer periphery of the back end of the body 1. In this embodiment, the housing 5, nut 2, nut cover 9, arresting disk 28, and back cover 10 simultaneously rotate relative to the gripper body 1.

FIGS. 33-38 show a chuck according to a seventh embodiment of the present invention. In this embodiment, a stop ring 98 is installed between the inner circular section plane 223 of the nut 22 and the thread terminal end plane 32 of the jaws 3, and a fixed sleeve 12 to fix the axial position of the nut 22 and the stop holder 98. The bottom end of the nut 22 has a concave groove 227 that extends toward the outside in the radial direction on the stop holder 98 to form a convex key 587 corresponding to the concave groove 227 so that the concave groove 227 fits with convex key 587 to connect the stop holder 98 and the nut 22 together. Referring to FIGS. 34 and 35, this stop holder 98 is similar to stop holder 78 in the third embodiment, described above. The stop holder 98 includes a plurality of stop pawls 981 on its upper end. Each stop pawl 981 has a connecting section 989, stopping section 982, outer side supporting section 988, protruding section 985, and lever section 986.

FIGS. 36-38 schematically show the operation of the chuck of this embodiment. In the figures, the direction of the jaws 3 rotating in relation to nut 22 is U, and the moving direction is V. FIG. 36 shows the jaws 3 moving back and about to contact the stopping section 982 and the end of the lever section 986. At this time, the space between the thread terminal end plane 32 of the three jaws 3 and the end of the stopping section 982 and the lever section 986 is less than one-third of a screw pitch. The figure shows the third (#3) and first (#1) gripping jaws 3. FIG. 37 shows the position of the first (#1) gripping jaw 3 close to turning 120 degrees (the difference is approximately the width of one gripping jaw). At this time, the thread terminal end plane 32 of the jaws 3 moves backward over the stop part 982 and the end of lever part 986 by a distance of "h". FIG. 38 shows the position after continuous turning of the nut to move the jaw 3 and its back end coming into contact with the end of the lever section 986 of the stop pawl 98. The figure shows the first (#1) and second (#2) gripping jaws 3. The end of the lever section 986 shifts back a distance "h" with the support of the end of the first (#1) gripping jaw 3. The stopping section 982 then moves forward a distance of W≈(L/1)×h due to the lever action in which the protruding section 985 is the fulcrum. At this time, the dimension of the overlapping section of the stopping section 982 and the jaw side surface 31 is H=h+W, and there was an increase in the dimension W as compared with a situation without the action of the lever section 986. As a result, the continued rotation of the jaws 3 in relation to nut 22 (and stop holder 98) is more effectively blocked.

FIG. 39 shows a stopping mechanism according to an eighth embodiment of the present invention. In this embodiment, the stop ring 58 extends outward in a radial direction and has convex key 587 with a stop pawl 581 formed on its upper surface. This stop pawl is similar to the stop pawl in the first embodiment, described above. In this embodiment, one end is the connecting end that connects with the inner side wall of stop ring 58 and the other end is the free end that forms stopping section 582.

Figure 40:
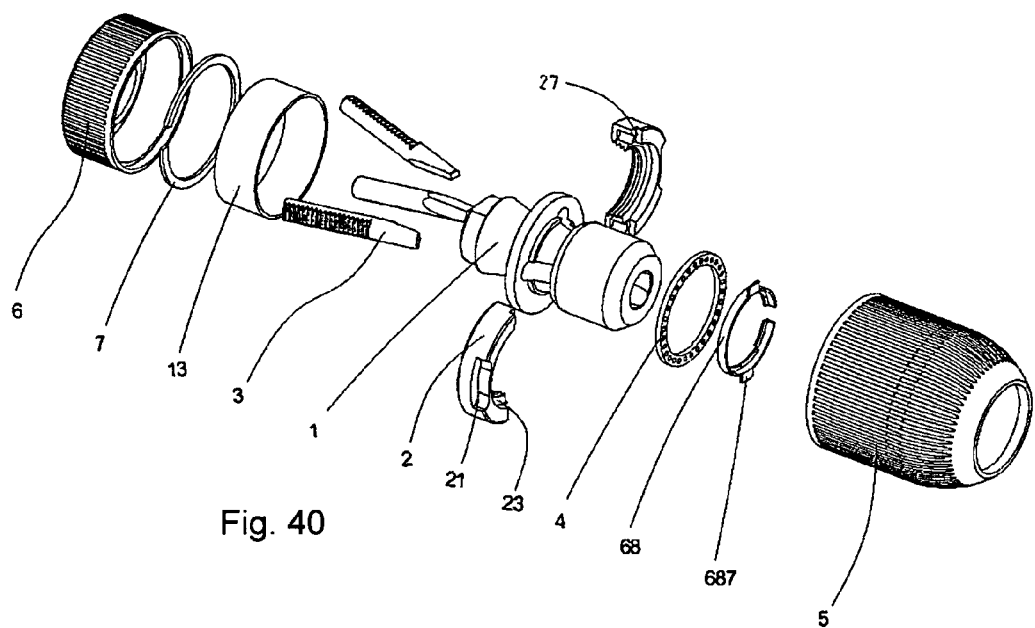
FIG. 40 is an exploded view of the chuck according to the ninth embodiment according to the present invention.
Figure 41:
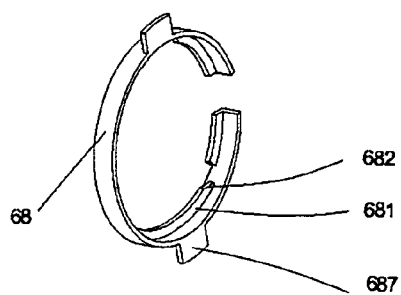
FIG. 41 is a perspective view of the stopping mechanism in the ninth embodiment.

FIGS. 40-41 show a chuck with a ninth embodiment of the stopping mechanism according to the present invention. In this embodiment, a stop ring 68 is open. The stop ring 68 has a convex key 687 that extends outward in a radial direction. The stop ring 68 has a stop pawl 681 with a stopping section 682. The structure of this stop ring 68 may be desirable for use with a nut 2 that is split to facilitate assembly.

Figure 42:
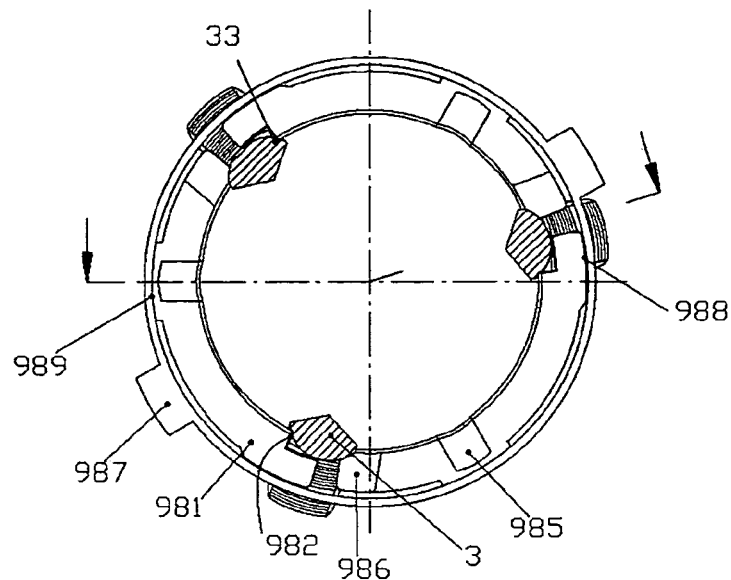
FIG. 42 is a schematic to show the jaws and the stopping mechanism according to a tenth embodiment of the present invention to show the stop pawl of the stopping device.
Figure 45:
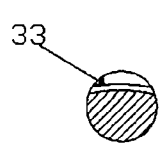
FIG. 45 is a cross-sectional view along the line A-A of FIG. 43.
Figure 43:
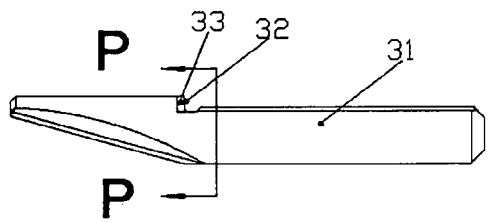
FIG. 43 is a side view of a jaw according to the tenth embodiment of the present invention.
Figure 44:
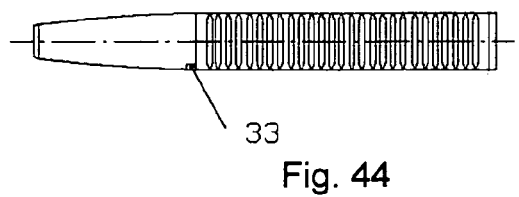
FIG. 44 is a top view of the jaw of FIG. 43.

With reference to FIG. 33 and FIGS. 42-44, a stopping mechanism according to a tenth embodiment of the present invention is shown. FIG. 42 shows the blocking of the jaws 3 by the stop pawl 981 of the stopping mechanism. FIGS. 43, 44, and 45 are separately the front view, top view, and cross-sectional view along line A-A of FIG. 42.

It can be seen that the jaws 3 have a plane stopping section 33 on the lateral surface 31 that contacts the stop pawl 981. This plane stopping section 33 can be formed by machining a notch on the lateral surface 31. When the jaws 3 move backward to the limit position, and the end of nut 22 (or inner circular section plane) comes into contact or is going to come into contact with thread terminal end plane 32 of the jaws 3, the stopping section 982 of stop pawl 981 of stop ring 98 is propped up on the plane stopping section 33 of the jaws 3 to prevent slippage from the lateral surface of gripping jaws 3.

Figure 46:
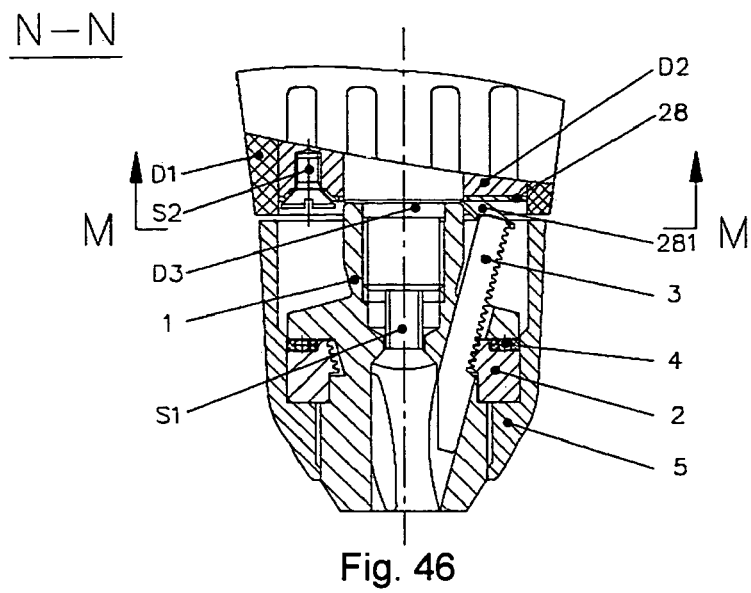
FIG. 46 is a partial cross sectional view of a chuck according to an eleventh embodiment.
Figure 47:
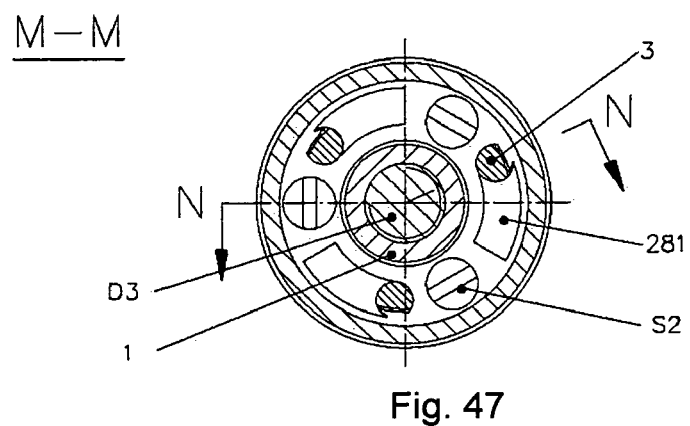
FIG. 47 is a cross-sectional view of the chuck along the line N-N of FIG. 46.
Figure 48:
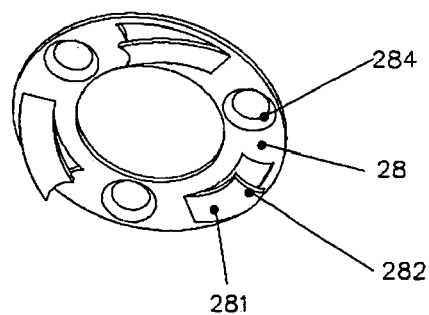
FIG. 48 is a perspective view of the stopping mechanism of FIGS. 45 and 46.
Figure 49:
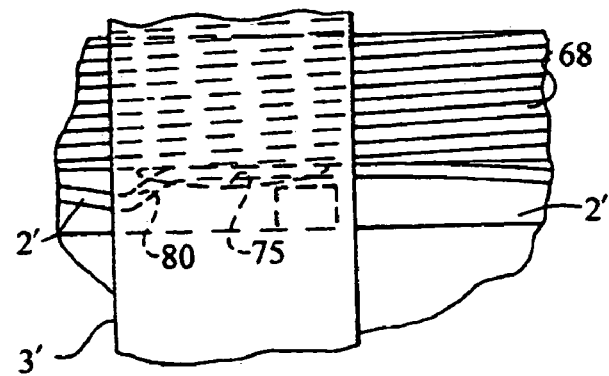
FIGS. 49 and 50 are schematics of the stopping mechanisms according to the prior art.
Figure 50:
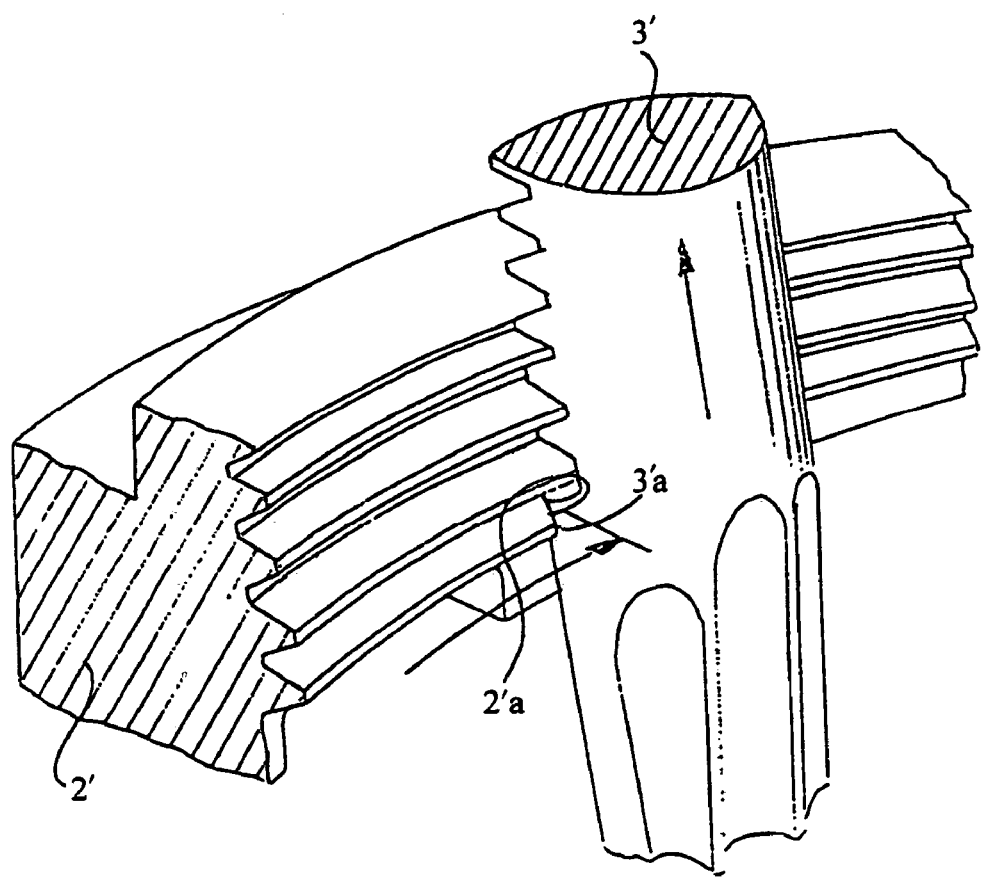

FIG. 46 is a schematic of the structure of a type of a driver of which only the sectional structures of the connecting section of the front end of the driver and the chuck along the line N-N is shown. FIG. 47 is a sectional view of the structure along the line M-M in FIG. 45. FIG. 48 is a perspective view of the arresting disk 28 of FIGS. 46 and 47.

It can be seen from FIG. 46 that the front end of the driver has a cover cup D1, and it is jacketed on the outside of mounting D2. The middle of the front end of the driver has a drive shaft D3 and the body 1 of the chuck is connected to drive shaft D3 and it is fixed tightly by means of screw S1. A stopping mechanism in the form of an arresting disk 28 surrounds the body and may be fixed on the front end of the mounting D2 in the front end of the driver. The arresting disk 28 may have a hole 282 through which a screw S1 can pass. The free end of the stop pawl 281 has a stopping section 282 that extends along the first direction in a forward slant. The end section of the stopping section 282 has a concave cambered surface that fits with the lateral surface of gripping jaws 3.

When one wishes to loosen the jaws 3, the sleeve 5 while the body is rotated in a direction causing the jaws to move rearward toward the driver. At this time, the jaws 3 rotate with the body while the nut 2 is fixed in relation to housing 5. Owing to the fact that gripping jaws 3 rotate in relation to nut 2, the gripping jaws 3 simultaneously move backward. When the gripping jaws 3 move backward to the limit position, the stopping section 282 of the stop pawl 281 on the arresting disk 28 is propped up to the lateral surface of gripping jaws 3 to prevent the further rotating of body 1 and to prevent friction and jamming between the gripping jaws 3 and the nut 2.

The above description is not to be used to limit the claims and one skilled in the art will understand that various alterations and changes can be made without altering the scope of the claimed invention.

What is claimed:

1. A chuck for use with a manual or powered driver having a rotatable drive shaft, the chuck comprising:
   a. a body having a forward section and a rearward section adapted to mate with the drive shaft of the driver and the forward section having an axial bore with a plurality of angularly disposed passageways that intersect the axial bore;
   b. a plurality of jaws positioned in the passageways, with each jaw having a tool engaging face formed on one side and threads formed on an opposite side;
   c. a nut rotatably mounted about the body and having threads on an inner circumferential surface to engage the threads on the jaws;
   d. an outer sleeve in driving rotational engagement with the nut so that when the sleeve is rotated with respect to the body the jaws will move;
   e. a stopping mechanism that at least partially surrounds the body and rotates with the nut; and,
   f. at least one elastic pawl associated with the stopping mechanism wherein upon the jaws reaching a predetermined position within the passageways further rotation of the nut in an opening direction is prevented by contact between the pawl and a lateral surface of the jaws, the lateral surface extending in a direction from one end of the jaws toward an opposite rear end of the jaws.

2. The chuck of claim 1 wherein the stopping mechanism includes a stop sleeve that is rotatably fixed to the nut.

3. The chuck of claim 2 wherein the stop sleeve has a top and the elastic pawl extends radially inward from the top.

4. The chuck of claim 2 wherein the stop sleeve is open.

5. The chuck of claim 1 further comprising a plurality of elastic pawls.

6. The chuck of claim 1 wherein the stopping mechanism includes an outward extending convex key along a radial direction and a bottom end of the nut has a corresponding concave groove.

7. The chuck of claim 1 wherein the pawl includes a connecting section that is in contact with an inner surface of the stopping mechanism and a stopping section that slants forward and extends along a first direction defined by the rotational direction of the sleeve that causes the jaws to move rearward.

8. The chuck of claim 7 wherein the stopping mechanism and the connecting section are monolithic.

9. The chuck of claim 1 wherein the rear end of the jaws contacts a portion of at least one stop pawl at the predetermined position.

10. The chuck of claim 9 wherein the at least one elastic pawl includes:
    a. a connecting section located in the middle of the at least one stop pawl and connected to the stopping mechanism;
    b. a stopping section located on a first side; and
    c. a lever section located on a second side opposite the first side.

11. The chuck of claim 10 further comprising an outer side support section located on an outer side of the pawl corresponding to provide support when the stopping section contacts the jaw.

12. The chuck of claim 10 wherein the lever section forms an inclined plane.

13. The chuck of claim 10 further comprising a rear sleeve connected to the rear of the body wherein the at least one stop pawl includes a protruding part that extends upward and contacts an inner portion of the rear sleeve.

14. The chuck of claim 1 wherein the stopping mechanism includes an arresting disk.

15. The chuck of claim 14 further comprising a nut sleeve rotatably fixed to the nut and having a rear end at least one key that engages a corresponding at least one groove provided on the arresting disk.

16. The chuck of claim 15 wherein the at least one elastic pawl extends from the arresting disk and includes a stopping section with a concave cambered surface that contacts the jaw.

17. The chuck of claim 1 further comprising a stop sleeve with wherein the at least one stop pawl includes:
    a. a stopping section that extends radially inward to contact a rear portion of the jaws;
    b. a connecting section that connects the at least one stop pawl to the stop sleeve; and
    c. a lever section that extends radially inward such that when the jaws reach the predetermined position, a portion of the lever section is in contact with the rear end of the jaws to cause the stop pawls to pivot.

18. The chuck of claim 17 wherein the stopping section includes an arc bending structure that extends and protrudes laterally inward.

19. The chuck of claim 17 wherein each of the at least one stop pawl is a separate part and each can be pivotally connected to the stop sleeve.

20. The chuck of claim 19 wherein the connecting section includes a pivot hole that forms a connection to the stop sleeve.

21. The chuck of claim 20 further comprising a stop ring passing through the pivot hole of each of the at least one stop pawls to secure the pawls to the stop sleeve.

22. The chuck of claim 21 wherein the stop ring is open.

23. The chuck of claim 17 wherein a rear end of the stop sleeve extends inward in a radial direction to form a part of the stopping section.

24. A chuck for use with a manual or powered driver having a rotatable drive shaft, the chuck comprising:
   a. a body having a forward section and a rearward section adapted to mate with the drive shaft of the driver and the forward section having an axial bore with a plurality of angularly disposed passageways that intersect the axial bore;
   b. a plurality of jaws positioned in the passageways, with each jaw having a tool engaging face formed on side and threads formed on an opposite side;
   c. a nut rotatably mounted about the body and having threads on an inner circumferential surface to engage the threads on the jaws;
   d. an outer sleeve in driving rotational engagement with the nut so that when the sleeve is rotated with respect to the body the jaws will move;
   e. a stopping mechanism that at least partially surrounds the body and rotates with the nut, wherein the stopping mechanism includes a stop sleeve that is rotatably fixed to the nut; and
   f. at least one elastic yawl associated with the stopping mechanism wherein upon the jaws reaching a predetermined position within the passageways further rotation of the nut in an opening direction is prevented by contact between the pawl and the jaws, wherein at least one of the stop sleeve and the outer sleeve has a key and the other of the stop sleeve and the outer sleeve has a groove that correspondingly receives the key to interengage the sleeves.

* * * * *